Aug. 28, 1956
C. E. GREEN
2,761,117
DIRECTIONAL TRANSDUCER
Filed Jan. 16, 1952
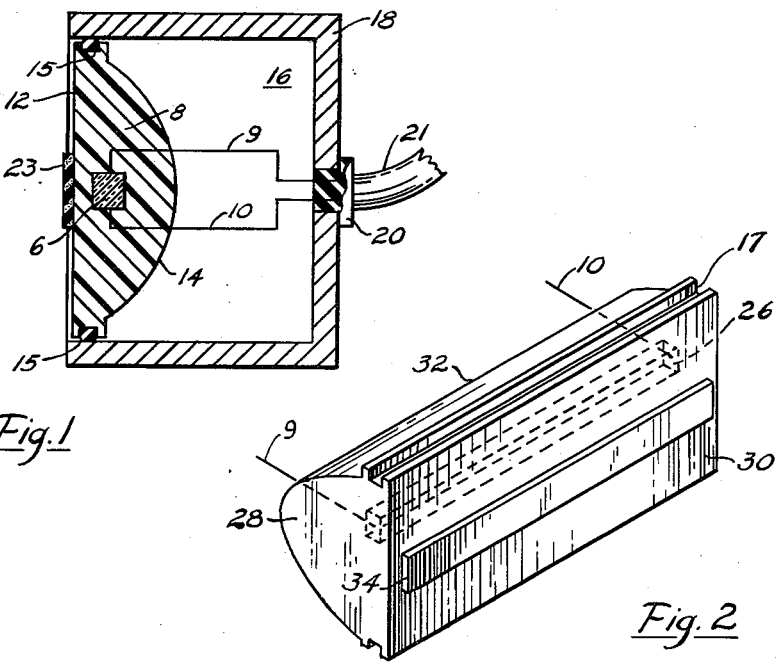
Fig. 1
Fig. 2
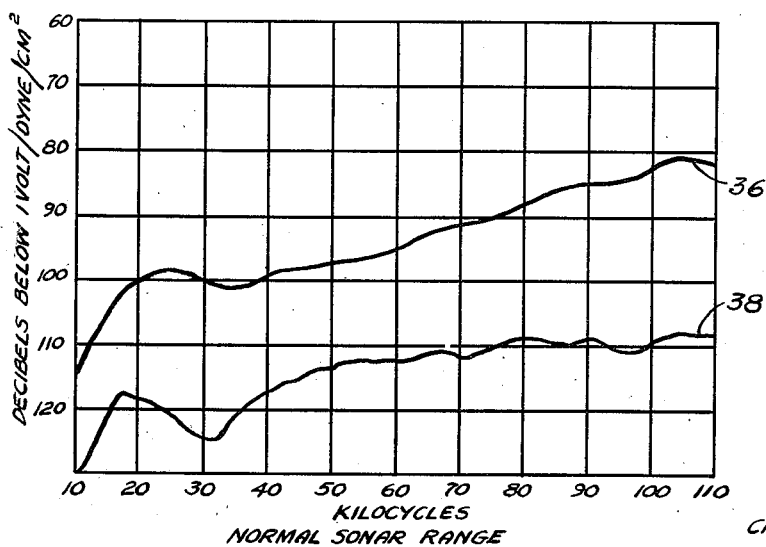
Fig. 3
INVENTOR.
CHARLES E. GREEN
BY D. E. Snyder
A. R. McCrady
ATTORNEY

2,761,117
DIRECTIONAL TRANSDUCER

Charles E. Green, San Diego, Calif.

Application January 16, 1952, Serial No. 266,770

5 Claims. (Cl. 340—8)

(Granted under Title 35, U. S. Code (1952), sec. 266)

This invention relates to a signaling device for use in sonar equipment of the type wherein an electromechanical transducer is embedded in a continuous solid which is shaped to amplify the detected signal.

In sonar equipment, it is important that the transducer be rugged to withstand hydrostatic pressure and that the response to signals be as large and as direction-sensitive as possible. It is desirable that the hydrophone be simple and inexpensive to construct and have a minimum of acoustic impedance changing boundaries.

Transducers commonly include a sensitive element at least partially surrounded by a fluid and one or more outside envelopes to keep sea water out and to protect the sensitive components from physical damage. In the instant invention, the transducer is mounted in a solid. This solid is molded or otherwise formed to have a front window through which the sound waves enter and a back side substantially in the shape of a parabolic reflector adapted to direct the sound waves to the transducer which is mounted at the focus of the parabola. By this means, amplified sound waves are picked up by the protected transducer. This type of transducer can withstand rough handling since the element is permanently fixed in position and cannot be forced out of alignment or exposed to sea water without complete destruction of the embedding solid.

An object of the invention is to improve the construction and performance of hydrophones and projectors for use in sonar equipment.

Another object is to provide a highly sensitive signaling device with a small, inexpensive transducer element.

Other objects and many of the attendant advantages of this invention will be readily appreciated as the same becomes better understood by reference to the following description.

Fig. 1 is a sectional view showing the encased transducer in relation to the parts with which it is used;

Fig. 2 shows a modification of the form of transducer and encasing solid shown in Fig. 1; and Fig. 3 illustrates the respective response characteristics of a device similar to that shown in Fig. 1, and of an unmounted transducer.

The apparatus shown in Fig. 1 comprises a transducer 6 surrounded by a solid 8 having the form of a paraboloid of revolution closed by a circular plane surface 12. The transducer may be a piezoelectric crystal or a magnetostrictive element of any known design. Ammonium dihydrogen phosphate, Rochelle salt, lithium sulphate, and barium titanate are some of the materials which may be used in the sensitive element. Electrical connections to opposite faces of the element are made through leads 9 and 10. The solid 8 surrounding the transducer is composed of a water-insoluble material having low sound absorption and low reflection losses at the solid-sea water interface. A number of plastics, such as polystyrene, highly transparent to compressional wave energy and having a high resonant frequency, are suitable imbedding materials. Elements not compatible with chemical setting plastics may be coated with a solvent evaporation setting plastic and then cast satisfactorily. A commercially available rubber generally known as "Rho-C" rubber is also a suitable material. "Rho-C" rubber has the same density and the same sound velocity characteristics as water. When the acoustic impedance of the solid matches that of water, a very broad band of frequencies is received. If the solid is mismatched, the frequency range is narrowed although there is a high gain within that range. Sound waves traveling in a solid are almost totally reflected when they come to a solid-gas interface, so the sound wave focusing action of the parabolic reflector is highly efficient. The solid has a parabolic surface 14 on the side away from sea water. The surface 12 exposed to the water is shown as planar but it may be formed to some spherical contour to give a lens action if that is desired. The solid material is capable of thus acting as a lens if the velocity of sound in the selected solid differs from the velocity in water. In order to prevent interference between reflected and unreflected sound waves, a sound absorbent shield 23 is provided to isolate the transducer 6 from the action of direct sound waves. A product known in the art as "Cell-Tite" rubber may be employed as a sound absorbent. Alternatively, the direct sound waves may be absorbed by means of a small sealed air chamber formed by machining a cavity in the front surface of the solid adjacent to the transducer and then covering the cavity with a layer of solid material. Many other types of sound absorbents are effective to eliminate the interference patterns resulting when direct and reflected waves conflict. The solid is provided with a peripheral groove for the O-ring seal 15 which keeps water out of the air chamber 16. The waterproof housing 18 may conveniently be metal, and the packing gland 20 and waterproof cable 21 provide means to protect leads 9 and 10 and the air chamber 16 from water.

In the operation of the invention, sound waves traveling under water from an external source impinge on surface 12. If the front surface is other than flat as shown such as convex or concave, the incoming sound waves may be diverged to broaden the directional pattern of the device or concentrated. The principal gain in signal strength takes place at the rear surface 14 where sound waves are reflected at the solid-air interface to the transducer located at the focus of the parabolic surface. The transducer converts the mechanical energy of the sound waves into electrical energy which is utilized in a separate apparatus of any suitable type. To operate the device as a transmitter, voltage is supplied to the transducer through leads 9 and 10. The resulting distortion of the element 6 gives rise to a pressure wave in the solid which reflects at the solid-air interface 14 and travels in parallel waves through the water from the surface 12. The device meets reciprocity requirements and hence will operate as a transmitter as well as a receiver, and the same unit may be used for both functions. The considerable area of the solid makes it possible to operate the device with the transducer stressed almost to the limit before cavitation results whereas in transmitters employed in the prior art, the large elements required reach the limitation of cavitation long before the element is under maximum allowable stress, thus precluding efficient utilization of the very expensive large units.

The directivity of the device shown in Fig. 1 may be modified as shown in Fig. 2 to send or receive a narrow band of sound pulses in one plane. A line element 26 is embedded at the focus of a solid 28 generated by moving a parabola normal to its own plane. The element 26 may be a single, long, slender unit or a number of short elements joined together. The embedding solid is shown as having a rectangular planar front surface 30 and a parabolic rear surface 32. A strip of sound absorbent material 34 prevents unfocused sound waves from reaching the transducer 26. Leads 9 and 10 serve to connect the transducer to external apparatus. Groove 17 is designed to receive an O-ring seal for mounting the solid.

The parts of the apparatus shown in Fig. 2 operate in the same manner as corresponding parts of Fig. 1. Since the same highly sensitive device may be used for sending and receiving, it is possible to transmit sound pulses in a moving narrow band by rotating the apparatus on the longitudinal axis and receive any echo that may come back. When an echo is received, the apparatus is turned to sweep at right angles to the first sweep and the resulting second indication precisely fixes the direction of the objects causing the echo. The same sweep precedure may be followed with the transducer employed as a sound receiver only.

Fig. 3 shows the response characteristics of an ammonium dihydrogen phosphate crystal in the shape of a cube having approximately one-half inch sides. Line 36 represents underwater sound reception properties of the crystal embedded in a "Rho-C" rubber paraboloid with a plane, circular, outer face having a six inch diameter. Line 38 represents the characteristics of the same crystal in water with no surrounding solid. The abscissa extends from ten to one hundred and ten kilocycles which is the normal sonar range. The ordinate is in decibels below one volt per dyne per centimeter squared. It will be noted that the use of a shaped embedding solid increases the range of frequencies received and increases output by more than twenty decibels over most of the range for which data are plotted.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America, for governmental purposes without the payment of any royalties thereon or therefor.

What is claimed is:

1. In a hydrophone, an outer shell defining an air chamber, a solid body mounted in an opening defined by the walls of said outer shell, an electro-mechanical transducer embedded in said solid body, said body being substantially in the form of a paraboloid of revolution closed by a plane surface adapted to contact water with said transducer located at the focus of said paraboloid, and connecting means effective to connect said transducer to external apparatus.

2. In a signaling system adapted for alternate reception and transmission of sound waves in water, a rigid outer shell defining an air chamber, a sound transparent solid paraboloid closed by a substantially plane surface mounted in an opening defined by the walls of said shell, a crystal transducer embedded in said solid paraboloid at the focus of the parabolic surface thereof, sealing means effective to isolate said parabolic surface within said air chamber from water, conecting means effective to connect said transducer to external apparatus, and sound absorbing means effective to prevent direct, incoming sound waves traveling parallel to the principal axis of said transducer from affecting said transducer.

3. In a signaling device, an air chamber, a solid paraboloid of homogeneous material having uniform acoustic impedance throughout its mass self-supported within said chamber, an electro-mechanical transducer embedded in said solid paraboloid at the focus of the parabolic surface thereof, said paraboloid having a sound receiving face on the opposite side of said transducer from said parabolic surface, means on said sound receiving face for preventing sound waves traveling parallel to the principal axis of said transducer from being received thereby through said face, and electrical leads from said transducer extending to the exterior of said paraboloid.

4. In an underwater signalling device, a solid paraboloid, an electro-mechanical transducer embedded in said solid paraboloid at the focus of the parabolic surface thereof, electric leads from said transducer extending to the exterior of said paraboloid, watertight casing means having said solid mounted therein, said casing means having an air-filled volume forming a solid-gas interface with said parabolic surface, said paraboloid having a sound receiving face in communication with the surrounding water and disposed on the opposite side of said transducer from said parabolic surface, said paraboloid being composed of water-insoluble material having low sound absorption and low reflection losses at the solid-water interface thereof and having uniform acoustic impedance throughout the mass of the paraboloid, and means on said sounding receiving face for preventing sound waves traveling parallel to the principal axis of said transducer from being received thereby through said face.

5. A signal device as in claim 4 wherein the acoustic impedance of said paraboloid material matches that of the surrounding water whereby a broad band of frequencies is receivable by said device.

References Cited in the file of this patent

UNITED STATES PATENTS

| | | |
|---|---|---|
| 2,161,292 | Hahnemann | June 6, 1939 |
| 2,460,274 | Benioff | Feb. 1, 1949 |
| 2,480,535 | Alois | Aug. 30, 1949 |
| 2,558,563 | Janssen | June 26, 1951 |

FOREIGN PATENTS

| | | |
|---|---|---|
| 541,881 | Great Britain | Dec. 16, 1941 |